United States Patent Office 3,743,627
Patented July 3, 1973

3,743,627
PHOTOGRAPHIC ELEMENTS CONTAINING SYNTHETIC POLYMERIC VEHICLES
Donald Arthur Smith and Donald M. Copenhagen, Rochester, N.Y., assignors to Eastman Kodak Company, Rochester, N.Y.
No Drawing. Original application Apr. 22, 1968, Ser. No. 723,279, now Patent No. 3,637,394. Divided and this application May 3, 1971, Ser. No. 139,857
Int. Cl. C08f 27/08
U.S. Cl. 260—78.4 D 9 Claims

ABSTRACT OF THE DISCLOSURE

Novel synthetic polymers derived from poly(vinyl alcohol) useful as hardenable gelatin replacements in compositions, photographic emulsions and elements, and a process for preparing said polymers are disclosed.

This application is a division of our copending application Ser. No. 723,279 filed Apr. 22, 1968, now U.S. Pat. No. 3,637,394.

BACKGROUND OF THE INVENTION

Field of the invention

This invention relates to new poly(vinyl alcohol) derivatives and a process for their preparation. In one aspect, this invention relates to new polymers which are easily hardened and are compatible with hydrophilic colloids. In another aspect, this invention relates to the use of these polymers in photography and in image-recording elements.

Description of the prior art

It is generally known that in the preparation of image-recording and light-sensitive elements dispersing agents are needed as vehicles for the light-sensitive materials, for example, silver halide grains in silver-containing systems. Because of its good water permeability, thermo reversible gel formation, and other desirable properties, gelatin is generally used in whole or in part as vehicles for photographic materials.

Gelatin, however, despite its many good features, has certain disadvantages. For example, gelatin can be adversely affected by animal or vegetable organisms and environmental changes and in particular, humidity. Further, because gelatin is derived from natural sources, its quality is variable and its sources of supply are subject to change. Other undesirable features of gelatin include poor dimensional stability resulting in the tendency of gelatin films to become brittle upon exposure to air and to shrink causing curling. Gelatin layers cast in emulsion form do not always present a smooth surface due to air bubbles or other foreign matter and, similarly, gelatin layers often appear to be coated with a haze.

In order to overcome these and other undesirable qualities of gelatin, it is sometimes necessary to include compensatory addenda which, in themselves, are not always desirable since they can adversely affect sensitimetric quality.

Repeated efforts have been made to replace gelatin with synthetic substitutes which do not show these disadvantageous qualities. For many reasons, no synthetic substance is used more as a gelatin substitute than poly(vinyl alcohol). The use of poly(vinyl alcohol), however, also involves certain disadvantages which restrict its application as a dispersing agent and binding agent for photographic emulsions.

For example, poly(vinyl alcohol) can be mixed with gelatin only after precipitation of silver halide so that in photographic gelatin emulsions, use of poly(vinyl alcohol) as a dispersing agent is somewhat restricted by the method of preparation of the emulsion. In addition, poly(vinyl alcohol) generally is not used as a sole binding agent effectively.

Previous attempts to prepare hardenable poly(vinyl alcohol) layers from poly(vinyl alcohol) solution required the addition of products which were not satisfactory because they also caused adverse sensitometric effects and staining.

Other synthetic polymers such as polyacrylamide generally do not impart and exhibit sufficient protective or peptizing properties to suspension prepared therefrom. In addition, the reaction of poly(vinyl alcohol) with various polybasic organic acids or their anhydrides, for example, aromatic dicarboxylic acids such as phthalic acid and its anhydride is also known. Unfortunately, however, in employing these acids or their derivatives, only one of the carboxylic groups enters into the reaction so that the polymers obtained possess the remaining free carboxyl group and are completely soluble in water as the salts. Since the free carboxyl group is not a hardening site, these compounds cannot satisfactorily be used as binding agents or dispersing agents without other additives which often adversely affect the sensitometric properties of the elements.

It has been found to be most desirable to append hardenable sites, such as primary amino groups, to a poly(vinyl alcohol) moiety for photographic applications. However, appending such groups has heretofore been generally undesirable because of the necessity of employing various dangerous reagents such as hydrazine in the synthesis with the resulting hazardous working conditions. Furthermore, poor yields, the cumbersome apparatus required and the undesirable reaction conditions make such procedures generally unsuitable, and particularly in the preparation of vehicles for light-sensitive materials.

It is evident, therefore, that an improved polymer which combines the desirable characteristics of poly(vinyl alcohol) but which can be conveniently, inexpensively and simply improved by the inclusion of hardenable sites will greatly enhance the art.

SUMMARY OF THE INVENTION

This invention comprises new polymers having recurring units which are obtained by partially esterifying poly(vinyl alcohol).

One such ester unit derived from the reaction between poly(vinyl alcohol) and an aromatic N-carboxy anhydride has a primary amino site. These polymers are compatible with hydrophilic colloids, such as gelatin, are easily hardened and are particularly useful in photography.

One significant feature of this invention is that completely unexpected results are obtained using the anhydrides disclosed herein. Normally one skilled in the art might expect a polymerization reaction involving the splitting off of carbon dioxide from the anhydride, resulting in the formation of polyamides. However, surprisingly enough, this is not found upon the completion of our invention, for polyamides are not hardenable under photographically acceptable conditions and would not give rise to hardenable sites. Instead, upon the addition of a hardener, such as formaldehyde, immediate crosslinking is observed, clearly showing the presence of hardenable primary amino groups.

Accordingly, it is an object of this invention to provide new polymers of poly(vinyl alcohol) which exhibit desirable combinations of physical properties. Another object of this invention is to provide novel and improved image-recording and light-sensitive compositions. A further object of this invention is to provide novel polymers useful as dispersing agents and which are compatible with hydrophilic colloids ordinarily useful in preparing photographic emulsions. A still further object is to provide layer-forming binding agents for preparing photographic emulsions.

Other objects of this invention will become apparent from an examination of the specification and claims that follow.

DESCRIPTION OF THE PREFERRED EMBODIMENTS

In accordance with our invention, the above objects are attained with a new poly(vinyl alcohol) polymer comprising recurring units having the formula:

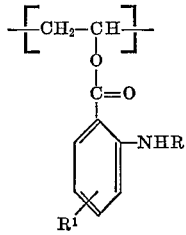

where R is hydrogen or methyl and $R^1$ is hydrogen, a lower alkyl group desirably containing 1 to 6 carbon atoms, a halogen atom such as chlorine, bromine or the like or a nitro group, said recurring unit having a relatively low molecular weight of about 160 to about 240. This recurring unit constitutes from about 1 to about 30 mole percent and preferably about 2 to about 25 mole percent of the polymer.

The novel polymers of this invention are excellent substitutes for hydrophilic colloids and particularly for gelatin in photographic applications since they exhibit the desirable properties of being permeable to processing solutions and are compatible in various light-sensitive image recording systems, such as silver halide and non-silver halide systems. In addition, these polymers exhibit significantly less curl than gelatin when formed into layers and placed on various supports. Further, these polymers are easily hardenable with hardeners customarily used to harden hydrophilic colloids. The hardeners include, for example, aldehydes, dialdehydes, and the like. These new polymers can be easily cast into layers forming clear and homogeneous products which, unlike gelatin, exhibit no haze or cloudiness. As such, they can be used as a sole binding agent or in combination with other colloids such as gelatin or even other vinyl polymers.

These novel polymers of our invention can be derived from the esterification reaction between hydroxyl-containing polymers such as poly(vinyl alcohol) and an aromatic nitrogen-containing carboxy anhydride. Aromatic N-carboxy anhydrides such as isatoic anhydride, also called orthocarboxyphenyl carbamic anhydride, are described in Chemistry of the Amino Acids, John Wiley, vol. 2, pp. 860–862 (1961). In some cases, however, chemical instability of such acids renders their existence almost theoretical, whereas their anhydrides, such as isatoic anhydride, are stable and hence available. The nitrogen atom of the isatoic anhydride can be further substituted with a methyl group. Examples of other derivatives of isatoic anhydride useful in preparing the compounds of the invention include, for example:

4-bromoisatoic anhydride;
6-bromoisatoic anhydride;
4-bromo-N-methylisatoic anhydride;
3-chloroisatoic anhydride;
5-chloroisatoic anhydride;
5-chloro-N-methylisatoic anhydride;
3-nitroisatoic anhydride;
3-nitro-N-methylisatoic anhydride;
3-methylisatoic anhydride;
6-methylisatoic anhydride;
3-propylisatoic anhydride;
3-isopropylisatoic anhydride; and
4-butylisatoic anhydride.

The introduction of the anthraniloyloxy moiety into the side chain of the polymer provides an amino group which is an exceptionally good crosslinking or hardening site. The hardeners are conveniently those most commonly used for hardening other hydrophilic colloids such as gelatin, for example, aldehydes, dialdehydes, dimethylolurea, vinyl sulfonyl ethers and other disclosed hereafter. In particular, when these novel polymers are included in gelatin-emulsion systems, formaldehyde provides an exceptional hardener for both dispersing agents in a single action. By poly(vinyl alcohol), as used in the preparation of the compounds of this invention, is meant the hydroxyl polymers containing a large number of recurring intralinear vinyl alcohol

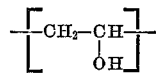

units known in the art and prepared by polymerizing a vinyl ester, e.g., vinyl acetate, vinyl chloroacetate, vinyl propionate, etc., followed by saponification of the resulting poly(vinyl esters). Other modifying groups can be introduced as set forth hereafter.

The poly(vinyl alcohol) starting materials employed in this invention are generally obtained by hydrolysis of poly(vinyl esters) of lower alkanoic acids such as poly(vinyl acetate), poly(vinyl propionate) and the like, although any source of poly(vinyl alcohol) known in the art is acceptable, provided that the material does not contain impurities which cause deleterious photographic effects when employed in photographic applications.

In practicing this invention, it is convenient to employ compounds of the "Elvanol" poly(vinyl alcohol) series (a trademarked compound of E. I. du Pont de Nemours and Co.). These compounds vary by formula and viscosity, for example, "Elvanol 52–22," a medium viscosity, 87–89% hydrolyzed poly(vinyl alcohol), "Elvanol 70–05," a low viscosity, completely hydrolyzed (99–100%) poly(vinyl alcohol), and "Elvanol 71–30," a medium viscosity completely hydrolyzed (99–100%) poly(vinyl alcohol). All of these compounds are obtained by the hydrolysis of poly(vinyl acetate).

In one embodiment of this invention, we have found that the water solubility of the poly(vinyl alcohol) polymers such as copoly(vinyl alcohol-vinyl anthranilate) can be improved and the chemical behavior of the polymer can be rendered amphoteric as shown by examples hereafter. This is accomplished by replacing a minor proportion, that is less than 49%, and preferably about from more than 0% to about 15%, of the hydroxy groups with carboxyacyloxy groups. This step involves esterifying said minor portion of the hydroxy groups, before the reaction between the polymer and the N-carboxy anhydride, with the following, for example, a dicarboxylic acid or the anhydride thereof, such as an aliphatic dicarboxylic acid, e.g., succinic acid, glutaric acid, methylglutaric acid and adipic acid; an unsaturated dicarboxylic acid, e.g., maleic acid, fumaric acid, glutaconic acid, and itaconic acid; an aromatic dicarboxylic acid such as phthalic acid, or a polybasic organic acid. Incorporating such dicarboxylic acids into the polymers of our invention provides free carboxylic acid groups which enhance the water solubility of the polymer and which, in a combination with the amine groups on the anthranilate moiety, renders the polymer amphoteric, i.e., compatible in basic, as well as acid and neutral media.

In another preferred embodiment of this invention, the above-mentioned poly(vinyl alcohol) polymer contains recurring units of more than two polymerizable compounds and preferably three compounds such as a terpolymer comprising poly(vinyl alcohol) and its esters of a dicarboxylic acid and N-carboxy anhydride. One such example is poly(vinyl alcohol-anthranilate-succinate) and still others are set forth hereafter.

The light-sensitive silver halide emulsion of a photographic element comprising the polymers of this invention can contain conventional addenda such as gelatin plasticizers, coating aids, antifoggants such as the azaindenes and hardeners such as aldehyde hardeners, e.g., formaldehyde, mucochloric acid, glutaraldehyde bis(sodium bisulfite), maleic dialdehyde, aziridines, dioxane derivatives and oxypolysaccharides. Sensitizing dyes useful in sensitizing such emulsions are described, for example, in U.S. Pats. 2,526,632 of Brooker and White issued Oct. 24, 1950, and 2,503,776 of Sprague issued Apr. 11, 1950. Spectral sensitizers which can be used are the cyanines, merocyanines, complex (trinuclear) cyanines, complex (trinuclear) merocyanines, styryls, and hemicyanines. Developing agents can also be incorporated into the emulsion if desired or can be contained in a separate underlayer. Various silver salts can be used as the sensitive salt such as silver bromide, silver iodide, silver chloride, or mixed silver halides such as silver chlorobromide or silver bromoiodide. The silver halides used can be those which form latent images predominantly on the surface of the silver halide grains or those which form latent images inside the silver halide crystals such as described in U.S. Pat. 2,592,250 of Davey and Knott issued Apr. 8, 1952.

The silver halide emulsion layer of a photographic element comprising our novel polymers can contain any other of the hydrophilic, water-permeable binding materials suitable for this purpose. Suitable materials include gelatin, colloidal albumin, polyvinyl compounds, celluose derivatives, acrylamide polymers, etc. Mixtures of these binding agents can also be used. The binding agents for the emulsion layer of the photographic element can also contain other dispersed polymerized vinyl compounds. Such compounds are disclosed, for example, in U.S. Pats. 3,142,568 of Nottorf issued July 28, 1964; 3,193,386 of White issued July 6, 1965; 3,062,674 of Houck, Smith and Yudelson issued Nov. 6, 1962; and 3,220,844 of Houck, Smith and Yudelson issued Nov. 30, 1965; and include the water-insoluble polymers of alkyl acrylates and methacrylates, acrylic acid, sulfoalkyl acrylates or methacrylates and the like.

The silver halide emulsion comprising our novel polymers can be coated on a wide variety of supports. Typical supports are cellulose nitrate film, cellulose ester film, poly(vinyl acetal) film, polystyrene film, poly(ethylene terephthalate) film and related films or resinous materials as well as glass, paper, metal and the like. Supports such as paper which are coated with alpha-olefin polymers, particularly polymers of alpha-olefins containing two or more carbon atoms, as exemplified by polyethylene, polypropylene, ethylene-butene copolymers and the like can also be employed.

Photographic emulsions comprising our polymers can also contain speed-increasing compounds such as quaternary ammonium compounds, polyethylene glycols or thioethers. Frequently, useful effects can be obtained by adding the aforementioned speed-increasing compounds to the photographic developer solutions instead of, or in addition to, the photographic emulsions.

The novel polymers of our invention can be used in photographic elements and in various kinds of photographic systems. In addition to being useful in X-ray and other nonoptically sensitized systems, they can also be used in orthochromatic, panchromatic and infrared sensitive systems. The sensitizing addenda can be added to photographic systems before or after any sensitizing dyes which are used.

The polymers of the invention can be used in emulsions intended for color photography, for example, emulsions containing color-forming couplers or emulsions to be developed by solutions containing couplers or other color-generating materials, emulsions of the mixed-packet type such as described in U.S. Pat. 2,698,794 of Godowsky issued Jan. 4, 1955; in silver dye-bleach systems; and emulsions of the mixed-grain type such as described in U.S. Pat. 2,592,243 of Carroll and Hanson issued Apr. 8, 1952.

Silver halide emulsions containing the novel polymers of the instant invention can be sensitized using any of the well-known techiques in emulsion making, for example, by digesting with naturally active gelatin or various sulfur, selenium, tellurium compounds and/or gold compounds. The emulsions can also be sensitized with salts of noble metals of Group VIII of the Periodic Table which have an atomic weight greater than 100.

The gelatin substitutes described herein can be employed as the binding agent in one or more layers of a photographic silver halide element. However, photographic silver halides are generally precipitated in the presence of binding agents such as gelatin or other colloids which exhibit very good peptizing action. Therefore, the photographic silver halide emulsions or layers of this invention will generally contain some binding agent such as gelatin which exhibits this very good peptizing action. Generally, the concentration of the polymers described herein as gelatin substitutes will be in the range of more than 0% and from about 10 to about 95%, often in the range of about 50 to about 95%, by weight, based on total binding agent (dry weight), employed in photographic emulsions, photographic emulsion layers or other layers of a photographic element. In the preferred case, the remainder of the binding agent is gelatin, although other colloids also give good results. Where the polymers are used in photographic elements in layers other than the emulsion layers, for example, in filter layers, antihalation layers, antiabrasion layers, antistatic layers, barrier layers, receiving layers for diffusion transfer processes and the like, they can be used as the sole vehicle or in admixture with natural or synthetic colloids such as are mentioned hereinbefore. The silver halide employed in the preparation of light-sensitive coatings described herein includes any of the photographic silver halides as exemplified by silver bromide, silver chloride and silver iodide, silver chlorobromide, silver bromoiodide and the like. Very good results are obtained with high contrast silver halide emulsions in which the halide comprises at least 50 moles percent chloride. Preferred emulsions of this type contain at least 60 mole percent chloride, less than 40 mole percent bromide and less than 5 mole percent iodide.

Silver halide emulsions containing the polymers of the invention can be used in diffusion transfer processes which utilize the undeveloped silver halide in non-image areas of the negative to form a positive by dissolving the undeveloped silver halide and precipitating it on a receiving layer in close proximity to the original silver halide emulsion layer. Such processes are described in U.S. Pats. 2,352,014 of Rott issued June 20, 1944; 2,543,181 of Land issued Feb. 27, 1951; and 3,020,155 of Yackel, Yutzy, Foster and Rasch issued Feb. 6, 1962. The emulsions can also be used in diffusion transfer color processes which utilize a diffusion transfer of an imagewise distribution of developer, coupler or dye, from a light-sensitive layer to a second layer, while the two layers are in close proximity to one another.

The following examples are included for a further understanding of the invention.

EXAMPLE 1

Preparation of copoly(vinyl alcohol-vinyl anthranilate)

A solution of 50 g. of poly(vinyl alcohol) (Elvanol 52–22) in 450 ml. of dimethylformamide at 150° C. is treated with a solution of 4.5 g. of isatoic anhydride in 60 ml. of dimethyl formamide. A vigorous gas evolution is noted immediately.

Heating and stirring are continued for about 10 minutes and then the polymer is isolated by precipitation in isopropyl alcohol. A sample upon analysis shows 0.63% nitrogen content corresponding to a copolymer containing 2.1 mole percent of vinyl anthranilate groups.

EXAMPLE 2

Preparation of poly(vinyl alcohol-vinyl anthranilate-monovinyl succinate)

A solution of 132 g. of poly(vinyl alcohol) (Elvanol 52–22) in 1300 ml. of dimethyl sulfoxide is prepared at 98° C., then cooled to room temperature. A solution of 30 g. of succinic anhydride in 100 ml. of dimethyl sulfoxide is added dropwise and the reaction mixture stirred on the steam bath for about two hours. The solution is again cooled to room temperature, then treated with 2 ml. of triethylamine followed by 49 g. of isatoic anhydride in 300 ml. of dimethyl sulfoxide. The mixture is again heated on the steam bath to complete the reaction. The resulting polymer is isolated by precipitation, washed in acetone and then dissolved in water containing a few milliliters of 10% sodium hydroxide. This polymer shows desirable solubility on both sides of an isoelectric region near a pH of 5.25 indicating the presence of both primary amino groups and free carboxylic groups. The rapid gelation of this polymer with formaldehyde confirms the presence of the primary amino group.

EXAMPLE 3

In order to determine the effectiveness of the polymer poly(vinyl alcohol-vinyl anthranilate-monovinyl succinate) as a dispersing medium in a light-sensitive element, a sample of said polymer is incorporated into a photographic coating as described hereafter.

A portion of a sulfur and gold sensitized silver bromoiodide gelatin emulsion containing 11 g. of gelatin/Ag mole and weighing 1500 g./Ag mole is melted and held for 0, 15 and 30 minutes respectively at a temperature of 65° C. The portion of the above emulsion which is not held at 65° C. is divided into four parts. To each of two parts is added 219 g. of gelatin, resulting in a total of 230 g. of gelatin per mole Ag for each part. To the two remaining parts is added 219 g. of poly(vinylalcohol-vinyl anthranilate-monovinyl succinate), as prepared in Example 2, each part now having a total of 230 g. of gelatin and polymer per mole Ag. To one of the gelatin and polymer parts and to one of the all gelatin parts is added 6.0 ml. of a 10% formaldehyde solution per mole Ag. No hardener is added to the other parts.

Those portions of the original emulsion which are held at 65° C. for 15 and 30 minutes respectively are divided and treated according to the procedure described above.

The gelatin and poly(vinyl alcohol-vinyl anthranilate-monovinyl succinate) used herein are added as 10% and 8.75% aqueous solutions respectively.

These melts are coated on a poly(ethylene terephthalate) film support at 381 mg. Ag./ft.$^2$ and 811 mg. vehicle/ft.$^2$.

The coating variations are tabulated as follows:

| Sample | Emulsion hold at 65° C. in minutes | Added vehicle | Hardener |
|---|---|---|---|
| 1 | 0 | Polymer | None. |
| 2 | 15 | do | Do. |
| 3 | 30 | do | Do. |
| 4 | 0 | do | Formaldehyde. |
| 5 | 15 | do | Do. |
| 6 | 30 | do | Do. |
| 7 | 0 | Gelatin | None. |
| 8 | 15 | do | Do. |
| 9 | 30 | do | Do. |
| 10 | 0 | do | Formaldehyde. |
| 11 | 15 | do | Do. |
| 12 | 30 | do | Do. |

These coatings are now exposed imagewise and developed for about 5 minutes in Kodak DK–50 developer, fixed, washed and dried. The coating containing a major proportion of polymer and a minor proportion of gelatin which is not treated with formaldehyde is washed off during processing due to its inability to withstand the alkaline environment and increased temperature of the processing solutions. However, similar coatings to which formaldehyde has been added do not wash off. The results show that the polymers of the invention contain active hardening sites capable of reacting with a conventional hardening agent such as formaldehyde. The hardened samples containing polymers of the invention exhibit far less curl than those containing only gelatin. In addition, they are clear and without haze, are permeable to processing solutions, exhibit good sensitometric qualities such as the absence of fog, loss of speed and density, and have a very smooth surface.

EXAMPLE 4

Copoly(vinyl alcohol-vinyl N-methylanthranilate)

A solution of 22.1 g. of polyvinyl alcohol (Elvanol 70–05) in 225 ml, of dry, distilled dimethyl sulfoxide is prepared at 95° C. A solution of 0.2 g. of sodium hydroxide dispersion (50% in a mineral oil) in 25 ml. of dry dimethyl sulfoxide is added with stirring. A solution of 8.9 g. (0.05 mole) of N-methylisatoic anhydride in 25 ml. of dry dimethyl sulfoxide is added causing a vigorous expulsion of carbon dioxide. Stirring at 95° C. is continued for about three hours and the resulting polymer is precipitated and washed thoroughly in isopropyl alcohol. Dried in vacuo at 50° C., the yield is 27.8 g. (97% of theoretical).

EXAMPLE 5

The above Example (4) is repeated using 0.3 ml. of triethylamine as a catalyst and although the reaction is less vigorous and more controllable, the product yield equals the theoretical amount.

EXAMPLE 6

Poly(vinyl alcohol-vinyl-N-methylanthranilate-monovinyl succinate)

To a solution of 246 g. of poly(vinyl alcohol) (Elvanol 71–30) in 7600 ml. of distilled dimethyl sulfoxide at 98° C., 60 g. (0.6 mole) of succinic anhydride in 200 ml. of dimethyl sulfoxide is added with stirring. This solution is stirred at 95° C. for about two hours. The 4 ml. of triethylamine and 106.2 g. (0.6 mole) of N-methylisatoic anhydride in 600 ml. of dimethyl sulfoxide are added and stirring is continued for about three hours more. The polymer is precipitated and washed thoroughly in isopropyl alcohol and stored damp.

EXAMPLE 7

In an example similar to that described more fully in Example 3, the effectiveness of the alkyl substituted anthranilate polymer in a light-sensitive element is determined. These results clearly show that said polymers harden, and resist abrasion and washing-off during processing which evidence is indicative of the presence of hardenable sites which are easily crosslinked with a hardener (formaldehyde).

These examples show that the polymers of the invention are supreior to gelatin in flexibility, abrasion resistance, and in dimensional stability. Further, these polymers are compatible with gelatin in photographic emulsion layers and they can be hardened with the same hardening agents as gelatin under the mild conditions required in a conventional photographic emulsion layer.

Although the invention has been described in considerable detail with reference to certain preferred embodiments thereof, it will be understood that variations and modifications can be effected without departing from the spirit and scope of the invention as described hereinbefore and in the appended claims.

We claim:
1. A hardenable poly(vinyl alcohol) copolymer consisting essentially of recurring units of vinyl alcohol and from about 30 mole percent to about 1 mole percent recurring units having the formula

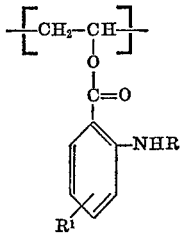

where R is hydrogen or methyl and $R^1$ is hydrogen, a lower alkyl group, a halogen atom or a nitro group.

2. A hardenable poly(vinyl alcohol) copolymer as set forth in claim 1 wherein said copolymer comprises copoly(vinyl alcohol-vinyl anthranilate).

3. A hardenable poly(vinyl alcohol) copolymer consisting essentially of recurring units of vinyl alcohol, from about 0 mole percent to about 15 mole percent recurring units of vinyl alcohol esterified with an organic polycarboxylic acid, and from about 30 mole percent to about 1 mole percent of recurring units of vinyl alcohol esterified with an aromatic N-carboxyanhydride.

4. A polymer as set forth in claim 3, wherein said aromatic N-carboxyanhydride is isatoic anhydride.

5. A polymer as set forth in claim 4, wherein said polycarboxylic acid is succinic acid.

6. A process for preparing a hardenable terpolymer of poly(vinyl alcohol), said process comprising first esterifying less than 49 mole percent of the alcohol with a polycarboxylic acid or anhydride, and subsequently reacting the resulting reaction product with an aromatic N-carboxyanhydride so as to yield a terpolymer comprising from about 1 to about 30 mole percent recurring units having the formula

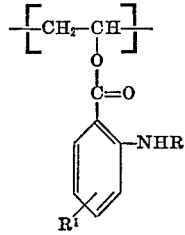

where R is hydrogen or methyl and $R^1$ is hydrogen, a lower alkyl group, a halogen atom or a nitro group.

7. The process of claim 6, wherein said polycarboxylic acid is succinic acid.

8. The process of claim 6, wherein said N-carboxyanhydride is an N-methylisatoic anhydride.

9. The process of claim 6, wherein said N-carboxyanhydride is isatoic anhydride.

References Cited
UNITED STATES PATENTS 2,948,610  8/1960  Merrill et al. _____ 96—33
3,000,741  9/1961  De Pauw et al. _____ 96—114

JOSEPH L. SCHOFER, Primary Examiner

J. KIGHT III, Assistant Examiner

U.S. Cl. X.R.

96—88; 260—78.5 T, 91.3 VA